United States Patent [19]

Solomon

[11] 4,354,917
[45] Oct. 19, 1982

[54] GAS ELECTRODE WITH ASYMMETRIC CURRENT DISTRIBUTOR

[75] Inventor: Frank Solomon, Great Neck, N.Y.

[73] Assignee: Diamond Shamrock Corporation, Dallas, Tex.

[21] Appl. No.: 202,574

[22] Filed: Oct. 31, 1980

[51] Int. Cl.³ .................. C25B 11/03; C25B 9/04; C25B 11/12; H01M 4/86
[52] U.S. Cl. .................. 204/284; 204/288; 204/289; 204/294; 429/44; 429/209; 174/129 R
[58] Field of Search .......... 204/279, 280, 284, 286, 204/288, 289, 294; 429/42, 209, 44; 174/117 M, 129 R, 133 R; 313/348–350

[56] References Cited

U.S. PATENT DOCUMENTS

| | | | |
|---|---|---|---|
| 1,470,577 | 10/1923 | Liebknecht | 204/284 |
| 1,719,774 | 7/1929 | Metcalf | 313/350 |
| 1,797,375 | 3/1931 | Smith | 204/284 |
| 3,515,595 | 6/1970 | Sanford | 429/44 X |
| 3,905,831 | 9/1975 | Brown et al. | 429/209 X |
| 4,020,239 | 4/1977 | Armstrong | 429/42 |
| 4,248,682 | 2/1981 | Lindstrom et al. | 429/42 X |

*Primary Examiner*—Donald R. Valentine
*Attorney, Agent, or Firm*—John P. Hazzard

[57] ABSTRACT

This disclosure is directed to an asymmetric woven wire mesh current distributor for an electrode containing more conductive elements (portions) in one direction than in the other direction when installed in use in an electrode so that the greater number of wires is perpendicular to the major current feeder bars and span the narrow part (conductive path) of a rectangular air cathode. In accordance with the preferred embodiment of this invention, the current distributor is a woven wire mesh wherein the numerical ratio between the number of said perpendicular wires to said parallel wires ranges from about 1.5 to about 3:1.

4 Claims, 2 Drawing Figures

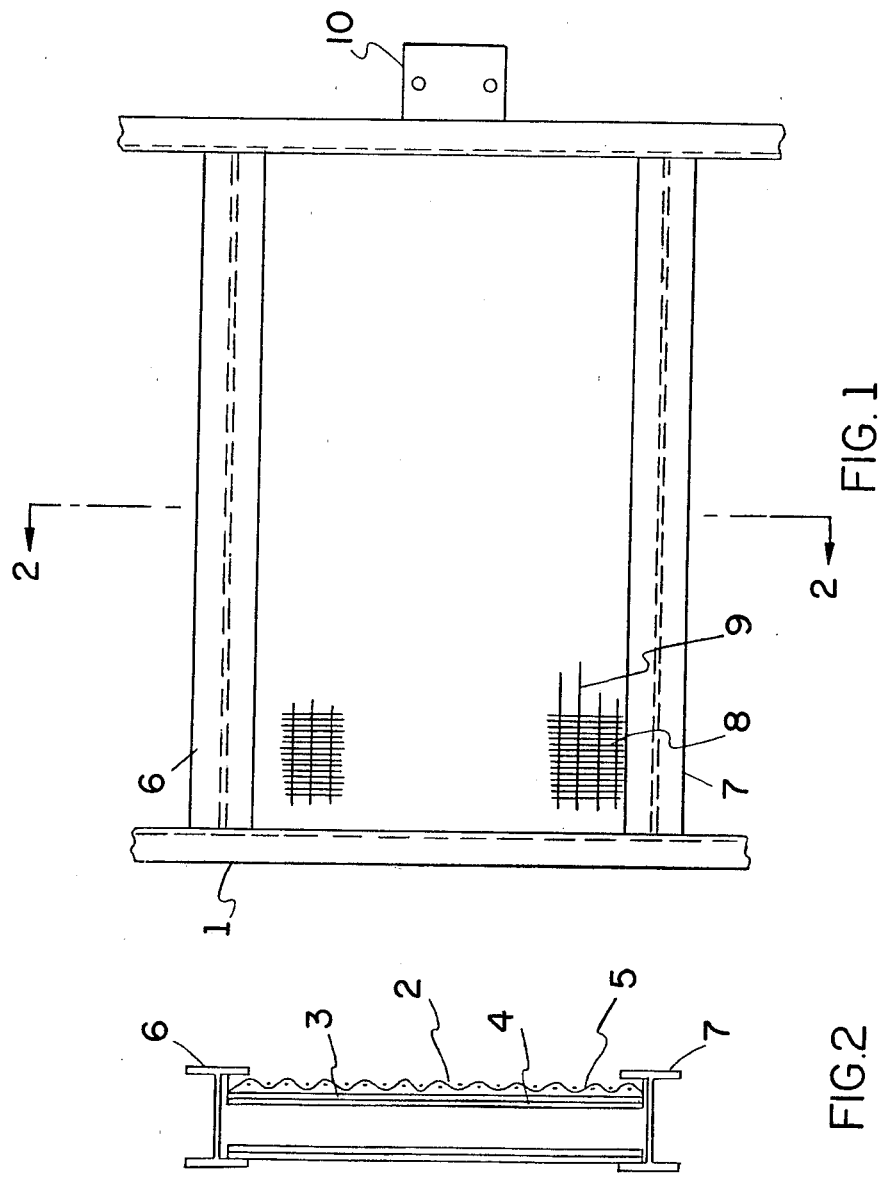

GAS ELECTRODE WITH ASYMMETRIC CURRENT DISTRIBUTOR

BACKGROUND OF THE INVENTION

In chlor-alkali cells, an electric current is passed through a saturated brine (sodium chloride salt) solution to produce chlorine gas and caustic soda (sodium hydroxide). Such cells are divided by a separator into anode and cathode compartments. The separator characteristically can be a substantially hydraulically impermeable membrane, e.g., a hydraulically impermeable cation exchange membrane, such as the commercially available NAFION ® manufactured by the E. I. du Pont de Nemours & Company. Alternatively, the separator can be a porous diaphragm, e.g., asbestos, which can be in the form of vacuum deposited fibers or asbestos paper sheet as are well known in the art. The anode can be a valve metal, e.g., titanium, provided with a noble metal coating to yield what is known in the art as a dimensionally stable anode. Steel cathodes are presently used for the cathodes. A large portion of the chlorine and caustic soda for the chemical and plastics industries is produced in chlor-alkali cells.

One of the unwanted by-products present in existing commercial chlor-alkali cells is hydrogen which forms at the cell cathode. It has been estimated that approximately 25 percent of the electrical energy required to operate a chlor-alkali cell is utilized due to the formation of hydrogen at the cathode. Hence, the elimination of hydrogen formation can lead to substantial energy savings and cost savings with respect to the electrical power required to operate such cells. Recently there has been considerable interest in oxygen (air) cathodes. These cathodes prevent the formation of molecular hydrogen at the cathode and enhance the formation of hydroxyl groups which, in turn, assist in the preparation of alkali which can be readily removed as a product. Savings in the cost of electrical energy are thereby achieved. Such oxygen (air) cathodes can utilize wire mesh current distributors as disclosed and claimed herein. Of course, the present invention is applicable to other electrodes in addition to oxygen cathodes and chlor-alkali cells.

BRIEF SUMMARY OF THE INVENTION

There has been disclosed an asymmetric woven wire mesh current distributor, especially for an oxygen (air) or other gas electrode having more conductive wires in the direction generally perpendicular to the major current feed to said distributor than in the direction generally parallel to said direction of major current feed. These generally perpendicular wires span the narrow (shorter) conductive path of said electrode.

FIELD OF THE INVENTION

The asymmetric woven wire mesh current distributors of the present invention are particularly useful in serving as a current distributor in an oxygen (air) cathode useful in chlor-alkali cells. Due to their asymmetric structure, substantial economies in material and weaving costs for the current distributor and control of the direction of current travel (with its resulting control of current path) can be achieved. The present invention is particularly useful when serving as the current distributor in three-layer laminated electrodes disclosed and claimed in the respective U.S. patent applications, Ser. No. 202,585 entitled "Three-Layer Laminate Electrode," filed in the name of Frank Solomon of even date herewith and U.S. patent application, Ser. No. 202,577 entitled "Three-Layer Laminate," filed in the names of Frank Solomon and Charles Grun, also of even date herewith.

PRIOR ART

The use of precious metals in conjunction with less noble metal electrode bodies is already known in the field of fuel cell gas electrodes. For example, U.S. Pat. No. 3,368,950, to Levine, et al., discloses producing fuel cell electrodes by electrochemically depositing a uniform precious metals coating on a thin, less noble metal body, e.g., platinum on gold; platinum on silver; palladium on silver; gold on silver; gold on copper; silver on copper; nickel on iron or platinum on iron.

U.S. Pat. No. 3,352,719 is directed to a method of making a silver-catalyzed fuel cell electrode by plating a silver catalyst on a carbon or nickel substrate.

British Patent No. 1,222,172 utilizes silver-coated nickel particles in combination with silver-coated carbon particles disposed in a PTFE (polytetrafluoroethylene) matrix in which there is embedded a nickel or other wire mesh screen (35).

U.S. Pat. No. 3,598,657, to Barber, discloses current collector screens (4) and (5) which can be made of tantalum for the acid electrolyte and nickel for the basic electrolyte.

French Pat. No. 1,520,791, to Gove, is directed to an electroconductive support containing an active catalyst constituted of a dispersion of thorium in nickel.

U.S. Pat. No. 4,191,618 shows an oxygen depolarized cathode wherein a mass of noble metal catalytic particles and particulate binder is bonded to the surface of a NAFION membrane.

In general, little attention has been directed to the particular configuration of the current distributor in relation to achieving economies and improvements in chlor-alkali cells containing oxygen (air) cathodes.

DETAILED DESCRIPTION OF THE INVENTION

The invention will be described in greater detail in conjunction with FIGS. 1 and 2 of the drawings.

FIG. 1 is a frontal view of an electrode incorporating an asymmetric woven wire mesh current distributor in accordance with this invention.

FIG. 2 is a cross sectional view thereof taken along the line 2—2 of FIG. 1.

As will be apparent from the drawings, oxygen (air) cathode (2) is mounted in a channel (1) which is comprised of upper and lower peripheral current feeder bars (6) and (7), which are the major current feeder bars. Said cathode has an active layer (3), a backing layer (4) and a current distributor (5). Mesh wires or elements (8) are arranged generally perpendicular to the major current feeder bars which are in turn connected to a current take-off means (10), whereas wires or elements (9) are positioned generally parallel thereto. These latter wires (9) traverse the length of the oxygen (air) cathode. According to this invention, there are more wires (8) perpendicular to the major current feeder bars than are parallel thereto. The asymmetric woven wire mesh current distributor as shown preferably has from 1.5 to 3 times as many such perpendicular wires (8) as parallel wires (9).

Such wires can be made of a variety of materials, including, but not necessarily limited to, nickel; nickel-plated copper; nickel-plated iron; silver-plated nickel; silver-plated, nickel-plated copper and like materials. The diameter of the wire can characteristically range from 0.003 to 0.007 inch (with plating in the case of plated wires). According to one preferred embodiment of this invention, the ratio between such perpendicular wires (8) and parallel wires (9) is approximately 2:1 which reflects cost economies of 25 percent in material and 50 percent in weaving time, e.g., with asymmetric woven wire mesh having a wire diameter of 0.005 inch with 50 strands/inch of perpendicular wires and 25 strands/inch of parallel wires versus conventional symmetrical woven wire mesh having a wire thickness of 0.005 inch and 50 strands of perpendicular wires/inch and 50 strands of parallel wires/inch.

Preferably, the wire material is selected from the group consisting of nickel; nickel-plated copper; silver-plated nickel and silver-plated, nickel-plated copper.

EXAMPLE

An asymmetric woven wire mesh of the basic type illustrated in FIG. 1 was formed using nickel wire strands having a diameter of approximately 0.005 inch with approximately 50 wires per inch and generally perpendicular to the major current feeder bars which were in the horizontal dimension and approximately 25 wires per inch generally parallel thereto and in the horizontal dimension. This nickel wire cloth was incorporated as the asymmetric woven wire mesh current distributor into a three-layer laminated electrode in accordance with the following procedure.

An active layer of catalyzed or uncatalyzed active carbon particles present within an unsintered network of fibrillated carbon black-polytetrafluoroethylene was placed on one side of said nickel asymmetric woven wire mesh and a wetproofing layer was assembled on the other surface of the active layer, viz., the nonworking surface, thereof. The active layer contained silver-catalyzed active carbon and was prepared in accordance with the invention described and claimed in U.S. patent application Ser. No. 202,578, filed in the name of Frank Solomon of even date herewith and entitled "Fibrillated Matrix Active Layer for an Electrode," the disclosure of which is incorporated herein by reference. Basically, this involved the following: commercially available "RB carbon" was found to have an ash content of approximately 12 weight percent as received. This "RB" carbon was treated in 38 percent KOH for 16 hours at 115° C. and found to contain 5.6 percent ash content after a subsequent furnace operation. The alkali treated RB carbon was then treated (immersed) for 16 hours at room temperature in 1:1 aqueous hydrochloric acid (20 percent concentration). The resulting ash content had been reduced to 2.8 percent. RB carbon, deashed as above, was silvered in accordance with the following procedure:

Twenty (20 g) grams of deashed RB carbon was soaked in 500 ml of 0.161 N (normal) aqueous $AgNO_3$ with stirring for two hours; the excess solution was filtered off to obtain a filter cake. The retrieved filtrate was 460 ml of 0.123 N $AgNO_3$. The filter cake was rapidly stirred into an 85° C. alkaline aqueous formaldehyde solution to ppt. Ag in the pores of the active carbon.

Calculation indicated that 79 percent of the silver in the catalyst was derived from adsorbed silver nitrate. The resulting ratio of silver to RB carbon was 0.13:1.

Separately, "Shawinigan Black," a commercially available acetylene carbon black, was teflonated with "Teflon 30" (du Pont polytetrafluoroethylene dispersion), using an ultrasonic generator to obtain intimate mixture. 7.2 grams of the carbon black/PTFE mix was high speed chopped, spread in a dish, and then heat treated at 525° F. for 20 minutes. Upon removal and cooling, it was once again high speed chopped, this time for 10 seconds. Then 18 grams of the classified silvered active carbon was added to the 7.2 grams of carbon black-Teflon mix, high speed chopped for 15 seconds, and placed into a fiberizing (fibrillating) apparatus. The apparatus used for fiberizing consists of a Brabender Prep Center, Model D101, with an attached measuring head REO-6 on the Brabender Prep Center and medium shear blades were used. The mixture was added to the cavity of the mixer using 50 cc of a 30/70 (by volume) mixture of isopropyl alcohol in water as a lubricant to aid in fibrillating. The mixer was then run for 5 minutes at 30 rpm at 50° C., after which the material was removed as a fibrous coherent mass. This mass was then oven dried in a vacuum oven and was high speed chopped in preparation for rolling.

The chopped particulate material was then passed through a rolling mill, a Bolling rubber mill. The resulting matrix active layer sheet had an area density of $22\frac{1}{2}$ milligrams per square centimeter and was ready for lamination.

A polytetrafluoroethylene (PTFE) containing wetproofing (backing) layer was prepared as described and claimed in U.S. patent application Ser. No. 202,583, filed in the names of Frank Solomon and Charles Grun of even date herewith and entitled "One Pass Process for Forming Electrode Backing Sheet," the disclosure of which is incorporated herein by reference. This procedure involved the following:

Two hundred cubic centimeters of isopropyl alcohol were poured into an "Osterizer" blender. Then 49 grams of du Pont 6A polytetrafluoroethylene were placed in the blender and the PTFE/alcohol dispersion was blended at the "blend" position for approximately one minute. The resulting slurry had a thick, pasty consistency. Then another 100 cc of isopropyl alcohol were added in the blender and the mixture was blended (again at the "blend" position) for an additional two minutes.

Then 91 grams of particulate sodium carbonate in isopropanol (ball milled and having an average particle size of approximately 3.5 microns as determined by a Fisher Sub Sieve Sizer) were added to the blender. This PTFE/sodium carbonate mixture was then blended at the "blend" position in the "Osterizer" blender for three minutes followed by a higher speed blending at the "liquefying" position for an additional one minute. The resulting PTFE/sodium carbonate slurry was then poured from the blender onto a Buchner funnel and filtered and then placed in an oven at 80° C. where it was dried for three hours resulting in 136.2 grams yield of PTFE/sodium carbonate mixture. This mixture contained approximately 35 weight parts of PTFE and 65 weight parts of sodium carbonate.

This mixture was mildly fibrillated in a Brabender Prep Center (Model D101) with attached Sigma Mixer (Model 02-09-000) having a volume cavity of 650 ml with a charge of approximately 140 g of mix for 10 to 20, e.g., 15 minutes, at 100 rpm at ambient room temperature.

After fibrillating, which compresses and greatly attenuates the PTFE, the fibrillated material is chopped to a fine, dry powder using a coffee blender, i.e., Type Varco, Inc. Model 228.1.00, made in France. Chopping to the desired extent takes from about 5 to 10 seconds because the mix is friable. The extent of chopping can be varied as long as the material is finely chopped.

The chopped PTFE-$Na_2CO_3$ mix is fed to 6-inch diameter nickel rolls heated to about 80° C. Typically, these rolls are set at a gap of 0.008 inch (8 mils) for this operation. The sheets are formed directly in one pass and are ready for use as backing layer in forming electrodes, e.g., oxygen cathodes, with no further processing beyond cutting, trimming to size and the like.

The thus formed layer (after removal of the pore-forming agent subsequent to lamination) is characterized as porous, self-sustaining, coherent, unsintered, uniaxially oriented backing (wetproofing) layers of fibrillated polytetrafluoroethylene having pore openings of about 0.1 to 40 microns (depending on the size of the pore former used).

Two three-layer laminates were formed either by roll bonding at roll temperatures above 90° C., e.g., 90° to 200° C., or by hydraulically pressing the three assembled layers at 4 to 8.5 tons/in$^2$ pressure and 90° to 200° C. for sufficient time to effect consolidation thereof. The asymmetric current distributor was positioned on the one (active layer) side while the backing layer was placed on the other side of the active layer.

These laminates were then hot soaked in ethylene glycol at 75° C. for 20 minutes before water washing at 65° C. for 15 hours and then dried. The purpose of this ethylene glycol hot soak is to reduce or eliminate blistering during water washing. This conditioning technique is disclosed and claimed in U.S. patent application Ser. No. 202,573, filed in the name of Frank Solomon of even date herwith and entitled "Electrode Layer Treating Process." The disclosure of this application is incorporated herein by reference.

These laminated three-layer cathodes were tested in half cells against counter electrodes using 38 percent aqueous NaOH at 300 milliamps per cm$^2$ current density to simulate the corrosive catholyte environment of a chlor-alkali cell. These cells were fed $CO_2$-free air at 3 to 5 times the theoretical rate of oxygen needed to operate an oxygen cathode in a chlor-alkali cell. The result was that the asymmetric woven wire mesh current distributors of this invention distributed the current in an efficient manner yet saved on material and weaving.

As will be noted from the testing conducted herein, the asymmetric woven wire mesh current distributors of this invention performed well when incorporated with an active layer and backing layer wherein said asymmetric woven wire mesh current collector was laminated to the "working" active layer side.

It is also within the purview of this invention to laminate the asymmetric current distributors of this invention on the air side, viz., the side containing the PTFE hydrophobic wetproofing (backing) material, when conductive material, e.g., highly porous carbon black particles, are incorporated with the PTFE in a porous electrically conductive backing layer. Such backing layers are disclosed and claimed in U.S. patent application Ser. No. 202,575 entitled "Electrode Backing Layer and Method of Preparing," filed in the name of Frank Solomon of even date herewith and U.S. patent application Ser. No. 202,582 entitled "Electrode Backing Layer and Method of Preparing," filed in the names of Frank Solomon and Lawrence J. Gestaut of even date herewith. The disclosures of both these applications are incorporated herein by reference.

What is claimed is:

1. An improved gas electrode having an active surface layer of activated carbon particles bound together by a carbon black-fibrillated polytetrafluoroethylene mixture with a current conductor content therewith, said current conductor comprising an asymmetric woven wire mesh having more conductive wire strands in the direction generally perpendicular to the major current feed to said conductor than in the direction generally parallel to said direction of major current feed.

2. An improved gas electrode as stated in claim 1 wherein said generally perpendicular wires span the shorter conductive path of said electrode.

3. An improved gas electrode as stated in claim 1 wherein the numerical ratio of generally perpendicular wires to generally horizontal wires range from about 1.5 to 3:1.

4. An improved oxygen cathode having an active surface layer of activated carbon particles bound together by a carbon black-fibrillated polytetrafluoroethylene mixture with a current collector in contact therewith, said current collector comprising a asymmetric woven wire mesh current collector having more conductive wire strands in the direction generally perpendicular to the direction of major current feed than in the direction generally parallel thereto, said generally perpendicular wire spanning the shorter conductive path of said cathode.

* * * * *

UNITED STATES PATENT AND TRADEMARK OFFICE
CERTIFICATE OF CORRECTION

PATENT NO. : 4,354,917
DATED : October 19, 1982
INVENTOR(S) : Frank Solomon

It is certified that error appears in the above-identified patent and that said Letters Patent are hereby corrected as shown below:

Column 6, line 27, delete "content" and insert --contact--.

Signed and Sealed this

Seventeenth Day of April 1984

[SEAL]

Attest:

GERALD J. MOSSINGHOFF

Attesting Officer    Commissioner of Patents and Trademarks